US006178453B1

(12) United States Patent
Mattaway et al.

(10) Patent No.: US 6,178,453 B1
(45) Date of Patent: Jan. 23, 2001

(54) VIRTUAL CIRCUIT SWITCHING ARCHITECTURE

(75) Inventors: Shane D. Mattaway, Boca Raton; Peter B. Reintjes, Del Ray Beach; David W. Killian, Lakeworthy, all of FL (US)

(73) Assignee: NetSpeak Corporation, Boca Raton, FL (US)

( * ) Notice: Under 35 U.S.C. 154(b), the term of this patent shall be extended for 0 days.

(21) Appl. No.: 08/832,746

(22) Filed: Apr. 4, 1997

Related U.S. Application Data

(60) Provisional application No. 60/038,060, filed on Feb. 18, 1997.

(51) Int. Cl.[7] ............................. G06F 15/16; G06F 15/17
(52) U.S. Cl. .......................... 709/227; 709/229; 709/313
(58) Field of Search ..................................... 709/204, 205, 709/227, 228, 238, 244, 245, 223, 300, 304, 305, 310, 318, 330, 331, 313; 370/352, 353, 260, 409; 345/329, 330, 331; 707/10, 104

(56) References Cited

U.S. PATENT DOCUMENTS

| | | | | |
|---|---|---|---|---|
| 5,212,789 | * | 5/1993 | Rago ........................................ | 707/10 |
| 5,528,671 | * | 6/1996 | Ryu et al. ............................. | 370/352 |
| 5,586,257 | * | 12/1996 | Perlman ................................ | 709/228 |
| 5,606,669 | * | 2/1997 | Bertin et al. .......................... | 709/223 |
| 5,689,553 | * | 11/1997 | Ahuja et al. .......................... | 370/352 |
| 5,734,828 | * | 3/1998 | Pendse et al. ........................ | 709/203 |
| 5,764,756 | * | 6/1998 | Onweller .............................. | 370/352 |
| 5,790,803 | * | 8/1998 | Kinoshita et al. ................... | 709/245 |
| 5,793,365 | * | 8/1998 | Tang et al. ............................. | 345/329 |
| 5,828,843 | * | 10/1998 | Grimm et al. ........................ | 709/204 |
| 5,838,970 | * | 11/1998 | Thomas ................................. | 709/303 |
| 6,016,393 | * | 1/2000 | White et al. .......................... | 709/315 |
| 6,029,175 | * | 2/2000 | Chow et al. .......................... | 709/203 |

OTHER PUBLICATIONS

Pan et al.; "Analysis of a CCSS#7 Network supporting database services"; IEEE International Conference on Information Engineering, Sep. 1993; ISBN: 0–7803–1445–X, pp. 193–197, vol. 1, Sep. 1993.*

Farag et al.; "Structure and network control of a hierarchical mobile network"; IEEE Fourteenth Annual International Pheonix Conference on Computers and Communications, Mar. 1995; ISBN: 0–7803–2492–7, pp. 671–677, Mar. 1995.*

Strom, David; "Talking Telephony"; Windows Sources, Ziff–Davis Publishing Company; Sep. 1996, v4, n9, p 150(2).*

* cited by examiner

Primary Examiner—Mark H. Rinehart
Assistant Examiner—Marc D. Thompson
(74) Attorney, Agent, or Firm—Kudirka & Jobse, LLP

(57) ABSTRACT

A virtual architecture for enabling direct point-to-point communications between any processes on a network cloud utilizes a process record in which information relevant to the process is stored and propagated through a parent/child hierarchy of connection service processes and information service processes. Process records and information relating to processes are propagated throughout private clouds, public clouds and interconnecting global services to facilitate both activity based network routing and load based network routing without the use of predetermined network routing mechanisms.

4 Claims, 10 Drawing Sheets

VIRTUAL CIRCUIT SWITCHING ARCHITECTURE

RELATED APPLICATIONS

This application claims priority to U.S. provisional patent application Ser. No. 60/038,060 entitled Virtual Circuit Switching Architecture by Mattaway et al., filed Feb. 18, 1997.

In addition, the subject matters of the following related applications are incorporated herein by reference:

U.S. patent application Ser. No. 08/533,115 entitled Point-to-Point Internet Protocol, by Glenn W. Hutton, filed Sep. 25, 1995;

U.S. patent application Ser. No. 08/719,894, entitled Directory Server For Providing Dynamically Assigned Network Protocol Addresses, by Mattaway et al., filed Sep. 25, 1996;

U.S. patent application Ser. No. 08/721,316, entitled Graphic User Interface For Internet Telephony Application, by Mattaway et al., filed Sep. 25, 1996, now U.S. Pat. No. 6,009,469.

U.S. patent application Ser. No. 08/719,891, entitled Method And Apparatus For Distribution And Presentation Of Multimedia Data Over A Computer Network, by Mattaway et al., filed Sep. 25, 1996;

U.S. patent application Ser. No. 08/719,554, entitled Point-to-point Computer Network Communication Utility Utilizing Dynamically Assigned Network Protocol Addresses, by Mattaway et al., filed Sep. 25, 1996;

U.S. patent application Ser. No. 08/719,640, entitled Method And Apparatus For Dynamically Defining Data Communication Utilities, by Mattaway et al., filed Sep. 25, 1996;

U.S. patent application Ser. No. 08/719,898, entitled Method And Apparatus For Providing Caller Identification Based Out-going Messages In A Computer Telephony Environment, by Mattaway et al., filed Sep. 25, 1996;

U.S. patent application Ser. No. 08/718,911, entitled Method And Apparatus For Providing Caller Identification Based Call Blocking In A Computer Telephony Environment, by Mattaway et al., filed Sep. 25, 1996; and U.S. patent application Ser. No. 08/719,639, entitled Method And Apparatus For Providing Caller Identification Responses In A Computer Telephony Environment, by Mattaway et al., filed Sep. 25, 1996.

FIELD OF THE INVENTION

The invention relates, generally, to data processing systems, and more specifically, to an architecture for enabling packet-switched networks to provide functionality similar to that contained in circuit-switched networks.

BACKGROUND OF THE INVENTION

Two fundamentally different switching technologies exist that enable digital communications. First, circuit switching technology utilizes dedicated lines or channels to transmit data between two points, similar to public switched telephone networks (PSTN). The second, packet switching technology, utilizes a "virtual" channel to establish communications between two points. The virtual communication channel is shared by multiple communication processes simultaneously and is only utilized when data is to be transmitted. Since the differing performance requirements for voice transmission and data transmission impose different design priorities, historical development of voice communication systems such as the telephone, and its related business systems, such as a corporate business telephone system, e.g. Public Branch Exchange (PBX) and Automatic Call Distribution (ACD), has centered on circuit switching technology. Conversely, data communication systems, such as Local Area Networks (LANs), Wide Area Networks (WANs) and the Internet have primarily relied upon packet switching technology. As a result, separate cultures and networking fabrics have evolved for the design, development, application, and support for real-time voice communications (circuit switched networks) and non real-time data transmission (packetized data networks).

Recently, attempts have been made to utilize packetized data networks for voice transmission with only limited success. One reason is that high quality, real-time interactive voice communications must emulate a reasonable approximation of a face to face conversion between two geographically separated people. To accomplish this, the modulated signal representing the spoken words should (i) have enough information to re-create a recognizable voice by using a fixed bandwidth, (ii) be delivered with minimum delay by using a dedicated path in order not to impede interactive communications, (iii) be delivered at a constant rate in order to avoid distortion to the ear of the listener and (iv) not be subject to significant loss of information en route. These capabilities are inherent in circuit switched networks such as the public switching telephone network (PSTN) but must be created when using packetized data networks for voice transmission.

The design of private "Intranets". e.g. LANs and WANs, and the Internet is fundamentally different from the architecture of conventional voice transmission networks. Packetized data networks break down data, e.g. a voice signal, into a series of small, discrete packets for transmission. Each packet of data travels independently through the network to the destination address where application software reassembles the packets to recreate the original data set. As currently designed, packetized data networks handle congestion by discarding or delaying packets or by sending packets from the same source along different pathways, often resulting in packets sequences arriving out of order. If the transmitted data packet represents real-time voice, the listener may perceive a gap or "choppiness" as a result of missing, late-arriving or out-of-sequence packets.

As the work environment increasingly demands faster access to greater volumes of information from multiple sources, the individual capabilities of separate circuit switched and packetized data networks are being seriously challenged. The response from circuit switch manufacturers has been the development of new switching system architectures that make it easier for separate, application-specific software to control the circuit switching function, and to seek to maintain the market value of circuit switched systems by increasingly using voice application processes to offer additional services such as voice mail, interactive voice response and ACD. The intensity of technical activity involved in further integrating the interaction of specific application processes and information delivery systems has given computer telephony integration the status of a technology in its own right.

A growing number of businesses and other organizations have recognized the Internet as a network which enables an enhanced form of public communication. In order to create conditions amenable to satisfactory commerce and business communications on the Internet, the same communication services offered via traditional voice transmission networks, such as the PSTN, must be available when communicating with customers via the Internet.

The introduction and rapid development of Internet Protocol ("IP") technology revolutionized the deployment and use of data communications networks such as the Internet. Even though this technology is in its infancy, it is already creating a growing demand for the integration of features and functions available in traditional voice communications networks into the packetized data network environment. The Internet represents primarily an access to potential markets that cannot be efficiently exploited if a separate, parallel infrastructure is required for its service.

Accordingly, it is an object of the present invention to provide a virtual switching architecture which enables packet-switched networks to provide functionalities similar to circuit switched networks and to interface with communications originating to and from circuit switched networks in a meaningful manner.

SUMMARY OF THE INVENTION

The present invention provides an architecture in which any two processes on a network cloud may establish a point-to-point communication link without predetermined routing mechanisms, and which further enables both activity based and load based routing of process communications.

In accordance with the first aspect of the present invention, a method of establishing communication from a first process to a second process comprises the steps of querying a first service process for the record of the second process, the process record comprising at least an identifier of the second process and a transport address of the logical location of the second process. The method further comprises the steps of receiving the process record from the service process, determining the transport address of the second process and establishing a direct point-to-point communication link with the process. In an alternate embodiment, the first service process may direct the requesting process to a second service process where the request is resubmitted.

In accordance with a second aspect of the invention, a method of assisting point-to-point communications between the processes on a network comprises the steps of maintaining a local database, the database comprising a plurality of process records for selected non-service processes coupled to the server process and the local databases of all child service processes coupled to the service process, selectively propagating the local database to a parent service process, receiving the request of a process for the record of a second process, searching the local database for the process record of the second process, and supplying one of the process record of the second process or the transport address of a route service process to the requesting process.

In accordance with a third aspect of the invention, a method for assisting point-to-point communication between processes comprises the steps of maintaining a local database, the database comprising selected data from the process record of non-service processes coupled the server process, selectively propagating the local database to a parent service process; and receiving an information catalog from the parent process and propagating the catalog to all child service process of the server process, the catalog comprising selected data from the process records of processes on the network cloud.

BRIEF DESCRIPTION OF THE DRAWINGS

The above and further advantages of the invention may be better understood by referring to the following description in conjunction with the accompanying drawings in which.

DESCRIPTION OF THE PREFERRED EMBODIMENT

Figure 1:
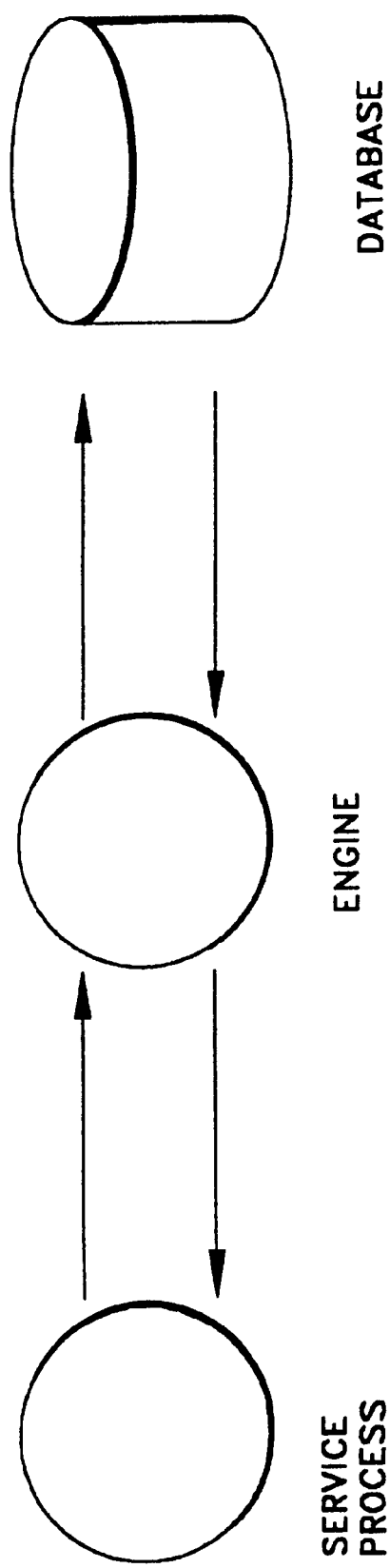
FIG. 1 illustrates conceptually the relationship between a service process and its accompanying database, in accordance with the present invention.

Prior to describing the virtual switching architecture in accordance with the present invention, a description of the individual component elements of the client processes and server processes comprising the architecture will be provided for the reader's benefit, as well as a description of the protocol which allow processes and services to interact in a uniform manner to implement the architecture of the present invention.

In the illustrative embodiment of the present invention, a number of protocol principles are set forth as follows to facilitate implementation of the present invention:

1. A process, for the purposes of this description, is defined to be a task or thread of execution having a specific function or a set of functions. A process may be an all software process or may be software executing in conjunction with specific hardware.

2. Processes preferably share a common digital, packet-based communication protocol and communicate with one another in a point to point manner, i.e. direct manner, over a virtual network circuit, referred to hereafter as a virtual circuit. Processes preferably use the same set of communication packet types to establish communications. Each process recognizes its own subset of communication packet types corresponding to the function it performs. A digital packet based communication protocol suitable for use with the present invention is described in detail in the previously identified patent applications, the subject matters of which are incorporated herein by reference. Such protocol is further utilized by the WebPhone internet telephony product commercially available from NetSpeak Corporation, Boca Raton, Fla.

3. Processes are only required to be connected to each other when communicating. Communications between processes are preferably transient in nature. A process may communicate with more than one process at the same time, e.g., in a conference or broadcast manner.

4. Processes are classified into "clients" and "services." Services may be deployed on any computer network which supports digital, packet-switched communication protocols to provide the infrastructure to support a communications network. Client processes are used by individuals to utilize and control the services comprising the communication network infrastructure.

In the illustrative embodiment, client processes may comprise receivers, transmitters, transceivers, controllers and interfaces. Receivers may be client processes which receive data, i.e., voice, video, text, animation, etc. from transmitters and/or transceivers. Transmitters are client processes which function to transmit similar data to receivers, while transceivers are processes which function to transmit or receive such data. An example of a commercially available product suitable for use as a client process with the present invention is the WebPhone Internet telephony product, commercially available from NetSpeak Corporation, Boca Raton, Florida. Controllers are client processes which enable users to administer, monitor or query services, as defined hereinafter. Interfaces are client processes which communicate with other processes to access and/or update a process data, e.g., billing software, etc.

Service processes, in the illustrative embodiment, may comprise connection services, information services, logging services, gateway services, asynchronous transmission (ATM) services, distribution services, messaging services, acquisition services, conference services, repeating services, routing services, finance services, advertising services, paging serves and other processes not listed herein. Any of the above-mentioned service processes may be implemented with software executing on a hardware platform, including appropriate network connections. Where possible, examples of commercially available products suitable for use with specific types of service processes are listed for the reader's benefit.

Connection services provide directory and information services which enable other processes to establish a point-to-point virtual circuit between two processes. An example of a service process and its accompanying database suitable for use with the present invention is set forth in U.S. patent application Ser. No. 08/719,894, entitled Directory Server for Providing Dynamically Assigned Network Protocol Addresses, filed Sep. 25, 1996 by Mattaway et al. Information processes provide client information to requesting processes, such information may be, for example, directory information, content information, programming schedules, etc. A server suitable for use with the present invention which provides both connection and information services is the NetSpeak connection server, Part No. NS-CS10, commercially available from NetSpeak Corporation. The connection server does not establish the connection between client processes but assists in providing directory information as well as maintaining a database of client processes currently on line. Logging services receive and store events logged by other services for reporting purposes, such as billing, security, network resource management, etc. Gateway services provide communication interfaces to other communication networks such as PSTN networks, frame relay networks, etc. A gateway product suitable for use with the present invention is the WGX gateway, Part No. WGX.MD/24, commercially available from NetSpeak Corporation. Distribution services route a requesting process to an available target process, according to a route algorithm which may be predetermined or dynamically adjusted depending on demand for distribution resources. Messaging services store and manage messages on behalf of client processes. Acquisition services acquire information from other processes in order to access and/or manage data. Conference processes provide multi-point data conferencing, i.e., a plurality of processes communicating with each other. In the illustrative embodiment, the conferencing may be performed in real-time and utilizes multimedia data, however, other less sophisticated data types, as well as non-real time communications may be utilized. Repeating processes provide simultaneous broadcasts of data to other processes. In the illustrative embodiment, repeating is performed in real-time utilizing multimedia data, typically through replication of data packets. However, as with conferencing, less sophisticated, non-multimedia data may be utilized as well as communications in non real-time. Finance services provide credit card and/or other debit and financial processing on behalf of requesting processes. A server suitable for use with the present invention to provide financial services is the NetSpeak credit processing server, Part No. NS-CPS10, commercially available from NetSpeak Corporation, Boca Raton, Fla. Advertising services deliver commercial data and/or messages to other processes, typically client processes. Paging processes provide communications to/from electronic paging apparatus for client processes.

The above-described service processes are exemplary in nature, it will be obvious to others skilled in the art that other types of processes may be equally utilized in the contemplated architecture if such processes generally comply with the other conditions described herein.

5. Each service process maintains its own database of information required for the service process to perform its intended set of functions. A service process may employ a database search engine associated with a database, for example, a search query language (SQL) engine associated with an SQL database, as illustrated in FIG. 1. Products adhering to other database protocols such as the ODBC database protocol, may be utilized as well. An example of a service process and its accompanying database suitable for use with the present invention is set forth in U.S. patent application Ser. No. 08/719,894, entitled Directory Server for Providing Dynamically Assigned NetWork Protocol Addresses, filed Sep. 25, 1996 by Mattaway et al. Further, a database server suitable for use with the present invention is the NetSpeak Database Server, Part No. NS-DBS10, commercially available from NetSpeak Corp.

6. Each process has an associated set of properties and/or data descriptors which define the process called a process record. In the present invention, a process record is a data structure which may be implemented in a form to facilitate both storage in databases as well as transmission in packets over a network. Process records are different for each type of process but may contain the following core properties:

type of process
Identifier(s)
domain name
transport address
fixed or dynamically assigned transport address
description
access control (local|organization|public)
primary connection service transport address
secondary connection service transport address
identifier of primary public carrier
identifier of secondary public carrier
inactivity interval In addition, service process records contain the following additional properties information:

primary logging service transport address secondary logging service transport address service specific status information Within the data structure comprising the process record, the individual process record properties may be implemented as described hereafter. The "type" of process field may be implemented with an unsigned long integer and identifies the type of process. The "Identifier'(s)" field may also be implemented with an unsigned long integer and identifies the process. The "domain" name field may be implemented as a variable character string and identifies the e-mail domain of the process. The "transport address" field may be implemented as a variable character string and identifies the transport address, e.g. another point on the virtual circuit. In the illustrative embodiment, such transport addresses may be implemented with Internet protocol addresses. The "fixed or dynamically assigned transport address" field may be implemented with a flag bit indicating whether the transport address, as described above, is fixed or dynamically assigned. The "description" field may be implemented with an unsigned long character string and provides a description of the process. Such description may be implemented with one or more "keywords" with which the subject process is to be associated. The "access control" field may be implemented with an integer, character string or a binary code and indicates whether a process record is available locally, organizationally, or publicly, as described hereinafter. The "primary and secondary connection service transport addresses" may be implemented with variable character strings and are used to identify the addresses, e.g. internet protocol addresses, of primary and secondary connection servers, respectively. The primary and secondary public carrier identifiers may be implemented with unsigned long characters and identify the primary and secondary public carriers utilized by a process, respectively. The primary and secondary public carriers are those service processors used to interface with a public cloud, as explained hereinafter. The "inactivity interval" may be implemented with an unsigned long integer and is used to designate a period of time or "heartbeat" interval in which inactivity by a process is acceptable. The concept of a "heartbeat" interval or "interval" packet is explained in detailed in U.S. patent application Ser. No. 08/719,894, entitled DIRECTORY SERVER FOR PROVIDING DYNAMICALLY ASSIGNED NETWORK PROTOCOL ADDRESSES, by Mattaway et al., filed Sep. 25, 1996, the subject matter of which has been previously incorporated herein by reference. The implementation of the packets for determining and modifying the value of such inactivity interval may likewise be implemented as described in the previously referenced application. The use of an inactivity interval within the process record in accordance with the present invention enables service processes to ensure that requesting processes will not be connected to a process which is no longer active or has on-line status. The primary and secondary logging service transport address may be implemented with variable character strings and identify the transport addresses, e.g. the Internet protocol addresses, of the primary and secondary logging services, respectively, utilized by the process. The service specific status field may be an unsigned character string indicating the status of the process. Such status may indicate for example, the resource load on the service process. For example, if the service process is a gateway, the service specific status information may indicate the number of ports on the gateway which are currently occupied, therefore enabling through use of a network management tool, a virtual architecture which performs network load based routing, as explained herein. The properties in each process record may be transmitted in one or more predefined packets, the actual form of which may vary according to design.

7. A service process may be configured via a controller client process to retransmit specific communication packets received from other processes to other specified destination processes. In the present invention, a controller client process refers to the ability of a user to define various parameters within a process record, utilizing an application such as the NetSpeak Control center, commercially available from NetSpeak Corporation, which enables a network administrator to remotely define various properties within the process record of a process. The set of specific communication packets to be retransmitted to specific processes is called the process's packet retransmission list. A process's packet re-transmission list may be redefined at any time. The action of retransmitting communication packets will be referred to as "propagation". Propagation may occur recursively through a network or cloud, as explained hereinafter.

8. Every process transmits its process record to its primary connection service when the process comes online i.e. connects to a network and can be configured via a controller client process to propagate all or part of the process record to its primary connection service in the event specific associated properties of the process record are changed. In the event a process cannot communicate with its primary connection service, the process will communicate with its secondary connection service.

Figure 2:
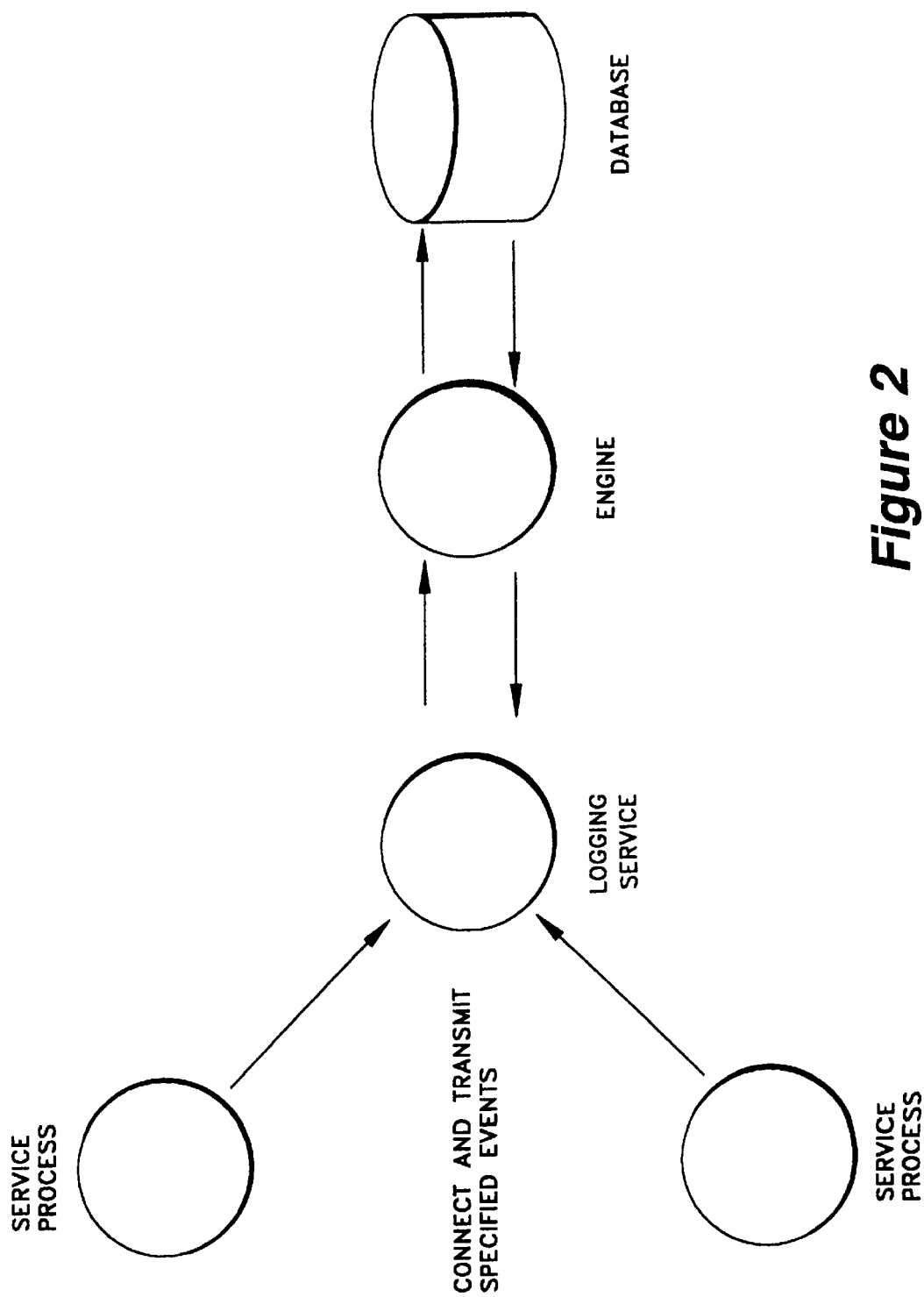
FIG. 2 illustrates conceptually the relationship between a service process and a logging service.

9. Every service process, except logging processes, may be configured via a controller client process to transmit information describing specific events to their primary logging service. In the event a process cannot communicate with its primary logging service, the process will communicate with its secondary logging service. Such a configuration is illustrated in FIG. 2.

Figure 3:
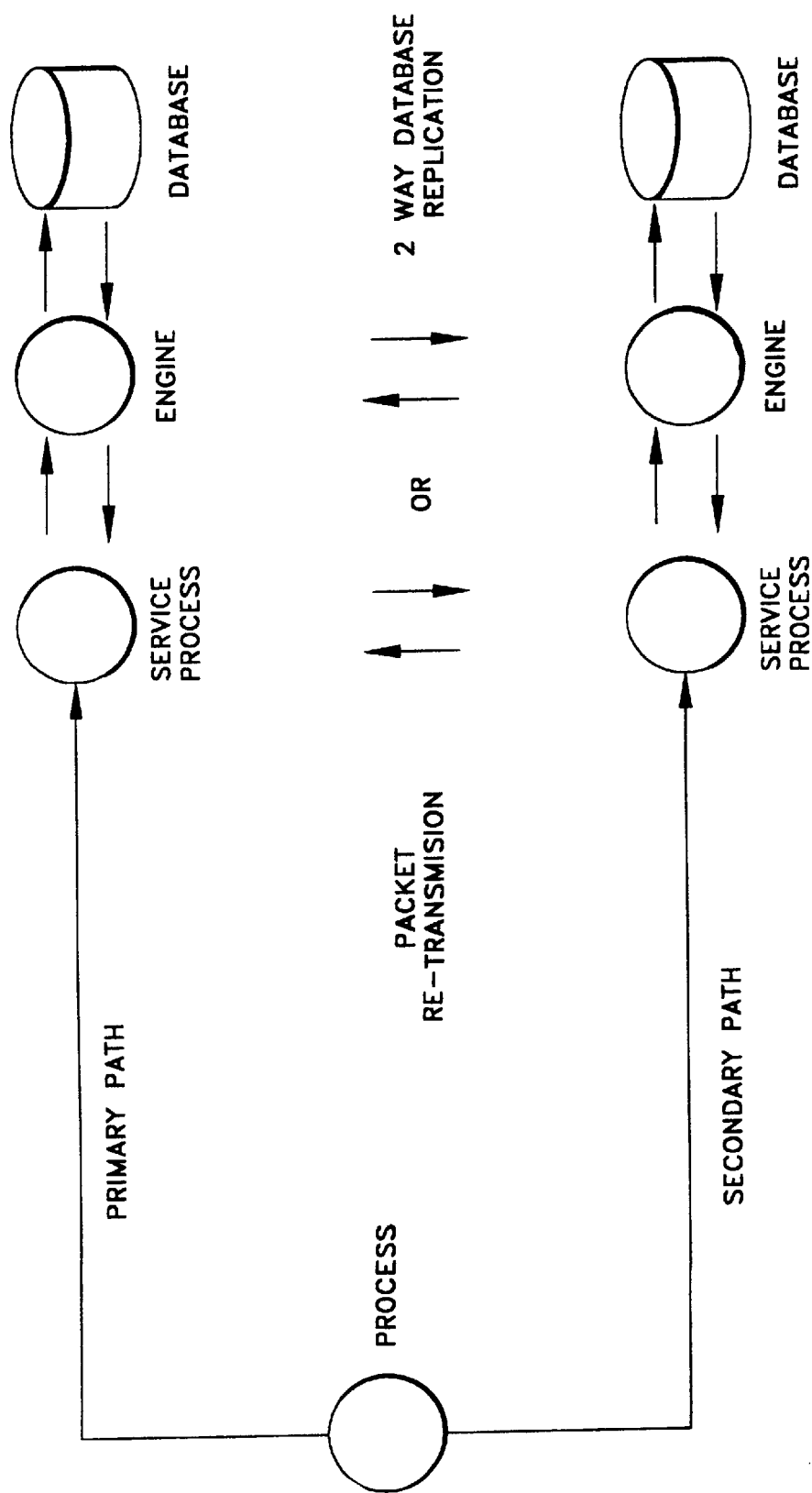
FIG. 3 illustrates conceptually the primary and secondary paths between a process and its primary and secondary servers.

10. Service processes may use protocol property 7, previously described, or their associated database engine's two way database replication to maintain synchronization between the databases of primary and secondary service processes hereby providing a reliable, fault tolerant infrastructure, as illustrated in FIG. 3.

Having defined and given examples of components capable of serving as client processes and server processes, as well as a description of a plurality of preferred protocol properties, a description of the network topologies and connections possible with the virtual switching architecture of the present invention is provided below.

Virtual Circuit Switching Architecture

With the virtual switching architecture disclosed herein, a process can establish a point-to-point communication with another process at the transport layer without the necessity of preconfigured routing tables, provided the processes are reachable over the virtual circuit. Processes are reachable if the network on which the calling process resides is either on the same network, e.g. a LAN, or is connectable over another network, e.g. the Internet as the target process. As explained hereinafter in greater detail, as long as two processes reside on the same cloud, the processes may establish a point-to-point communication link without the need for preconfigured routing between the respective processes.

For the purposes of this description, the term cloud refers to a plurality of networks which are themselves interconnected, i.e., a network of networks. Such networks and interconnections can comprise WANs, LANs, PTSNs, the Internet, private voice/data networks, public data service networks, etc., the construction and interconnection of such networks being within the scope of those skilled in the arts. Note, the actual construction of a cloud topology may comprise one or more network types. For example, a client process, for example a WebPhone application, may be connected to either its primary or secondary connection service process through a private local area network, for example within a corporation or organization. Alternatively, the client process may be coupled to its primary or secondary connection service process through an Internet service provider (ISP) over the Internet. The connection from the parent service process to its parent, may similarly be through any number of network types. Accordingly, the interconnections between server processes and non-server processes, as illustrated in FIGS. 1–10, may encompass any number of different network types and connections which collectively form a "virtual" network or topology. Examples of the actual hardware utilized to implement exemplary connections are described in one or more of the previously referenced U.S. patent applications and will not be repeated here for brevity. The protocol used over the cloud may comprise, for example, Internet protocol, or equivalent protocols, such as IPX, SPX and XNS, etc., depending on the network implementation.

Figures 4A, 4B:
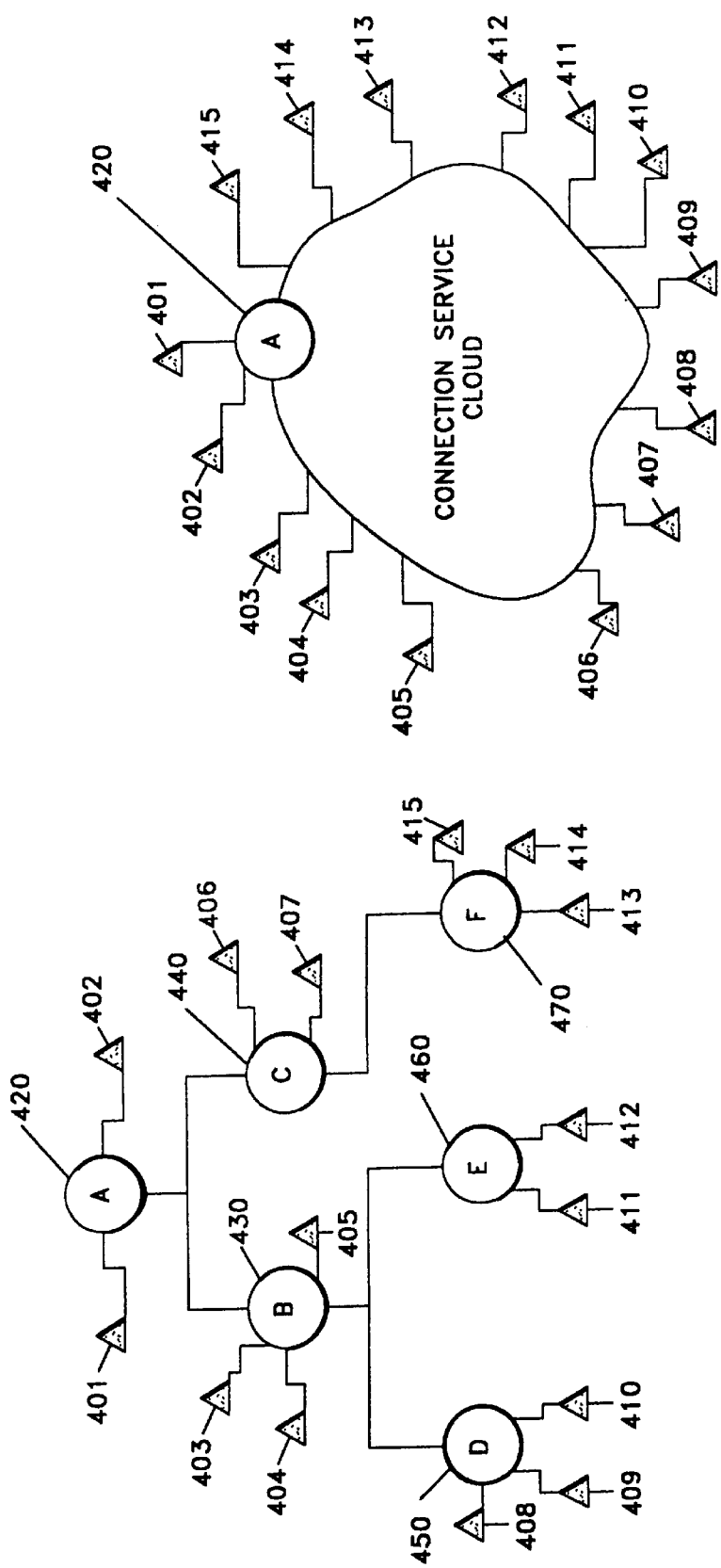
FIG. 4A illustrates the parent/child hierarchy of a connection services networks topology.
FIG. 4B illustrates conceptually, an equivalent topology of the network of FIG. 4A in accordance with the inventor.

Multiple connection services may be deployed in any configuration to construct a connection service cloud topology as illustrated in FIG. 4A–B. In the drawing, including FIGS. 4A–B, circles represent servers and triangles represent non-server processes. Only primary connections are shown. FIG. 4B illustrates the conceptual equivalent of the network topology illustrated in FIG. 4A.

In FIG. 4A, connection services 450 and 460 use connection service 430 as their primary connection service and connection services 430 and 440 use connection service 420 as their primary connection service. Observe that connection service 420 does not have a primary connection service and is called a root connection service. Generally, each connection service except the root connection service has a parent connection service and each connection service may have one or more child connection services.

Processes 401 and 402 use connection server 420 as their primary connection service while processes 408–410 use connection server 450 as their primary connection service. Each connection service may have a set of child processes.

Based upon protocol principle 8 previously described, each connection service has in its database the process records of its child processes, e.g., connection service 450 has in its database the process records of its child processes 408–410. When a connection service is configured via a controller client to propagate process records to its parent connection server, the connection service has in its accompanying database the process records for all its child processes, as well as all the child processes of its child connection services in a recursive fashion. For example, connection service 430 has in its database the process records for its child processes 403–405 as well as the process records for processes 408–412. The root connection service has in its database the process records for all processes on the connection service cloud, if the access control value of such process records allows, as previously explained.

There are, however, possible restrictions as to whether a process's process record may be retransmitted to another connection service. If a process's process record specifies local access control then its process record may not be retransmitted to another connection service. If the process record specifies organization control then its process record may be retransmitted all the way up to the root connection service, but no farther. If the process record specifies public control then its process record may be propagated all the way up to the root connection service and farther, as explained later under public connection service clouds.

When one process wishes to communicate with another process, it connects with its primary or secondary parent connection service and requests the transport address of a target process by specifying the type and identifier of the desired process as search criteria. The connection service will query its database of process records to find one or more processes matching the search criteria. In the event one process is found i.e. a target process, and its status allows a connection to occur, the connection service will return the target process's process record to requesting process and then disconnect from the requesting process. In the event the target process has a fixed transport address, the requesting process will then use the transport address in the returned process record to establish a point-to-point connection, i.e. virtual circuit, to the target process. If the target process has a dynamically assigned transport address, the requesting process will then use the primary or secondary connection service transport address in the target process record to connect to the target process's primary connection service to rerequest target process's process record in order to obtain the current transport address. Once the target process's process record is obtained, the requesting process will disconnect from that connection service and use the current transport address to establish a virtual circuit to the target process. The reason the root connection process is not connected to the requesting process is to eliminate the possibility that the transport address in the process record obtained from a root connection service is not current at the time of the request. Inherent time delays in propagation of updated process records up a connection service tree can cause the root connection service to have invalid data.

To facilitate a better understanding of the above described architecture, the following examples are provided for the reader's benefit. In a first example, process 404 connects to connection service 430 and requests to communicate with a target process identified by search criteria. Such search criteria may be based on properties of the process record such as the "identifiers" and "descriptor" field, for example, all process records whose last name begins with "A" and are located in Florida. Connection service 430 returns the target process record to process 404 then disconnects. Process 404 then uses the transport address in the returned process record to establish a point-to-point connection directly with the target.

If more than one process satisfies the search criteria submitted by process 404, connection service 430 may select one of the processes based upon the status of each candidate process i.e., select the process with the least load, or, connection service 430 may communicate with a preconfigured primary routing service and request the routing service to select one of the candidate processes based upon some predetermined or specified routing algorithm e.g., least cost route. A determination as to which of the process record satisfying the search criteria as the "best" candidate may be done in the following manner. Through use of a network management tool which adheres to the Standard Network Management Protocol (SNMP), the domain name of a processes process record and the service specific status information may be utilized to determine which service process is best able to handle a connection or additional process. Such tool will examine the domain name in each service process record as well as the service specific status information to make such a determination. In this manner, the virtual architecture described herein provides not only activity based network routing but load based network routing as well, the activity based routing being previously described with reference to the inactivity interval.

Once the best process is selected, connection service 430 will return the target process's process record to process 404 then disconnect. The requesting process 404 will then use the transport address in the returned process record to establish a virtual circuit to the target process.

If no process is found, connection service 430 may instruct the requesting process, process 404, to disconnect and reconnect to either the parent connection service of connection service 430, i.e., connection service 420 or the root connection service (which, in this example, is also connection service 420). The connection service to which the requesting process is instructed to reconnect is defined in the connection service 430 via a controller client process. If process 404 receives the instruction to reconnect to another connection service, it disconnects from its parent connection service and reconnects to the new connection service. Process 404 then reissues the request to connect to a specific process as defined by the request criteria.

With the inventive architecture, whether the requesting process navigates up the connection service tree or goes directly to the root connection service, if the target process exists on the connection service cloud, its process record will eventually be returned to the requesting process which will then use the transport address in the returned process record to establish a virtual circuit to the requested process.

In this manner, if each connection service were configured via a controller client to reconnect requesting processes to the root connection service whenever a request cannot be fulfilled, the maximum number of reconnections would be two before the requesting process established a point to point virtual circuit with the target process i.e. one connection if the target process has a fixed transport address or two connections if the target process has a dynamically assigned transport address (once to the root connection service and once to the target process's parent connection service).

In a second example, process 409 connects to connection service 450 and requests to communicate with process 407. Connection service 450 finds no such process so it instructs process 409 to reconnect to the root connection service 420 to reissue the request. Such instructions may be implemented with a packet returned to process 409 from connection service 450 which contains the transport address of root connection service 420. Connection service 450 then disconnects. Process 409 then connects to the root connection service 420 and requests to communicate with process 407. Root connection service 420 returns the process record of process 407 to process 409. Root connection service 420 then disconnects. Process 409 then uses the transport address in the returned process record to establish a point-to-point connection directly with process 407.

In the event the requested process does not exist on the connection service cloud, root connection service 420 will inform requesting process 409 that no processes were found which satisfy the request. Root connection service 420 will then disconnect.

Connection service clouds which have a root connection service are called private connection service clouds. A connection service cloud topology may be changed at any time e.g. by reconfiguring the primary and secondary connection services for each connection service via a controller client process. Once reconfigured, protocol principles 7 and 8 enable process record distribution according to the new connection service topology.

Figure 5B:
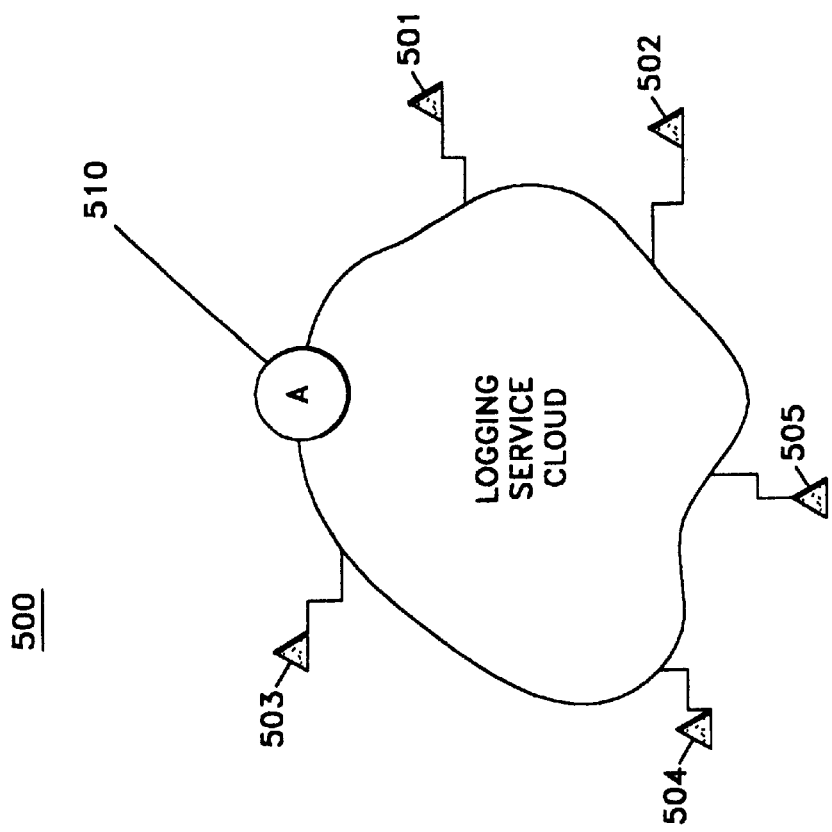
FIG. 5B illustrates conceptually an equivalent topology of the network of FIG. 5A.
Figure 5A:
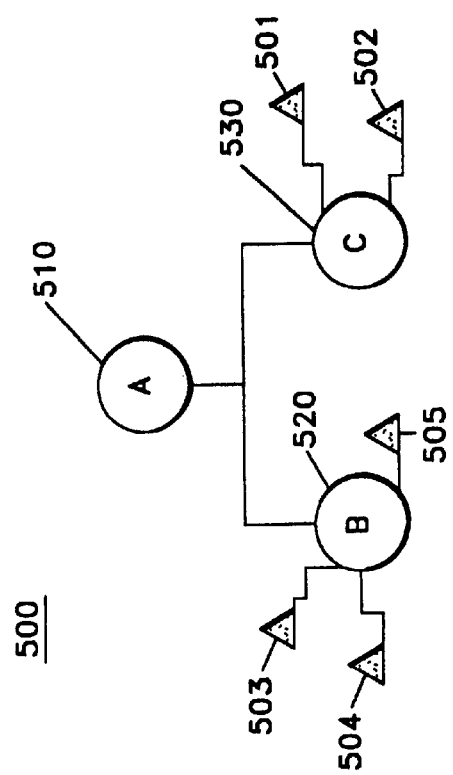
FIG. 5A illustrates a network topology of logging servers.

Using protocol principle 7, other services may be organized to construct clouds. Using logging services as an example, FIGS. 5A–B depict a logging service cloud 500 where the circles represent logging servers and the triangles represent service processes which log their events to the logging servers. Connection servers also log events to logging servers.

In FIGS. 5A–B, service processes 501 and 502 log their events to logging service 530 while service processes 503–505 log their events to logging service 520.

A controller client process may be used to define which events from each service process should be logged to their designated logging service. A controller client process may also be used to configure each logging service's packet retransmission list to identify which events should be retransmitted to other logging services, thereby establishing the logging service cloud topology.

Logging service 510, the root logging service of logging service cloud 500 has no parent logging service, as defined in its packet retransmission list and contains in its database either the entire set or a specified subset of events logged to its child logging services 520 and 530. In this manner, a logging service cloud provides a nested data warehouse of recorded service process events.

Note, in the inventive architecture, connection service clouds, e.g. FIGS. 4A–B, and other service clouds, e.g. FIGS. 5A–B, do not have to have the same topology.

Figure 6B:
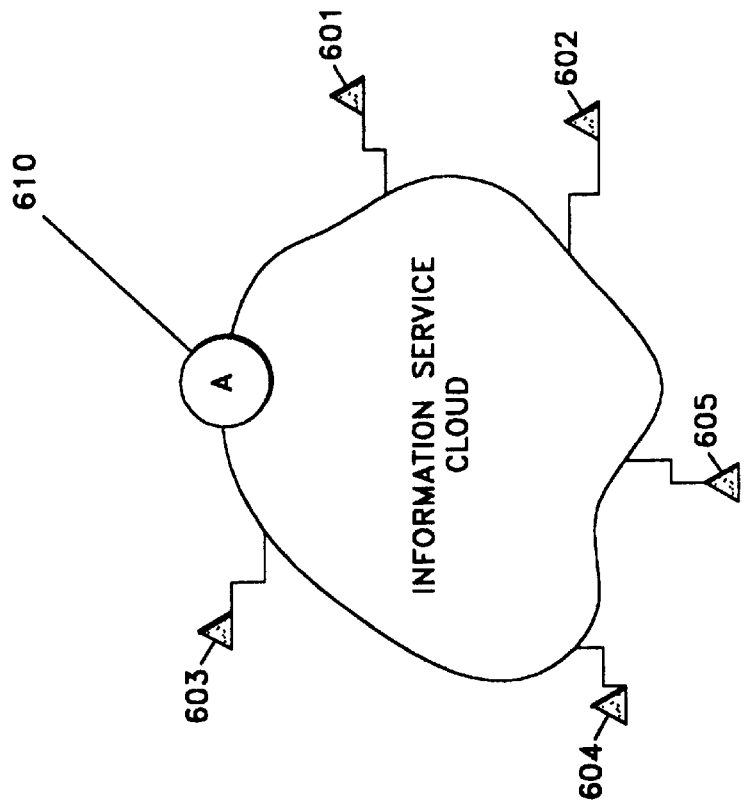
FIG. 6B illustrates conceptually an equivalent topology of the network of FIG. 6A.
Figure 6A:
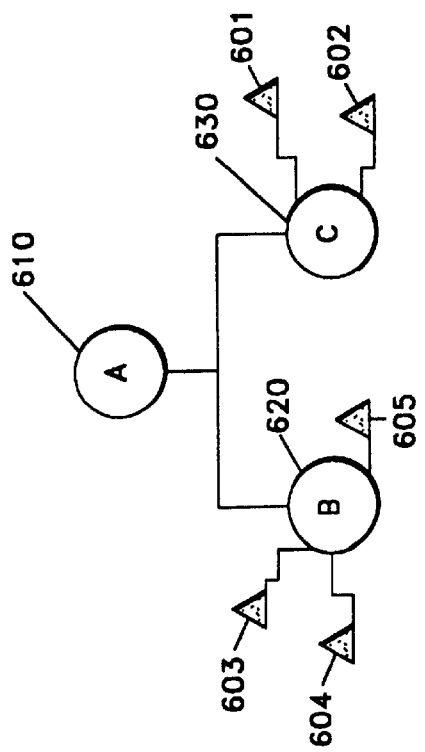
FIG. 6A illustrates a network topology of information services.

An example of an information service cloud is illustrated in FIGS. 6A–B. In FIGS. 6A–6B, circles represent information servers and the triangles represent client processes. Client processes 601 and 602 have their process records stored in information server 630 database and client processes 603–605 have their process records stored in information server 620 database. Root information service 610 may contain all or some of the client process records 601–605 depending upon the access control specified in each client's process record.

If a client's process record specifies local access control then its process record may not be propagated to another information service. If the client's process record specifies organizational access control, then its process record may be re-transmitted all the way up to the root information service, but no farther. If a client's process record specifies public access control, then its process record may be re-transmitted all the way up to the root information service, and farther, as explained hereafter with regard to public information service clouds.

In addition to child client process records, each information service communicates with either its primary or secondary parent information service to send its own process record, as well as all of its child information service process records, in a recursive manner. With this technique, the root Information service is able to compile a main information service catalogue for the information service cloud. The catalogue may be implemented with just a table of contents like structure to identify a process and the server process where the identified process record of the process is located. In information cloud 600, information service 620 and 630 send their process records to root information service 610. Information service 610 has the main catalogue of information services available in information service cloud 600. Information service 610 contains the process records of 620 and 630, hereafter designated as 610 (620, 630), i.e. parent (child, child).

If an information service process is configured via a controller client to be locally accessible, it will not propagate its own process record up to its parent information service process and hence not be present in the main information service catalogue.

Information service process records contain "keywords" in the description field which are used by client processes to help identify the information service.

The root information service sends to its child information services the main information service catalogue of all the information services comprising the information service cloud. Each such information service, in turn, sends the main information service catalogue to its own child information services. This propagation of the main information service catalogue continues downward to the next level of child information service processes, until all information services in the information service cloud have the main information service catalogue.

In the event a new information service is added to the information service cloud, its process record is propagated up to the root information service. The root information service process then reconstructs a new main information service catalogue which is then propagated down to all child information services in the cloud.

With this technique, whenever a client process connects with its parent information service to request information e.g. the transport address of a target process, the information service provides the client process with the latest main information service catalogue.

Public Clouds

Figure 7:
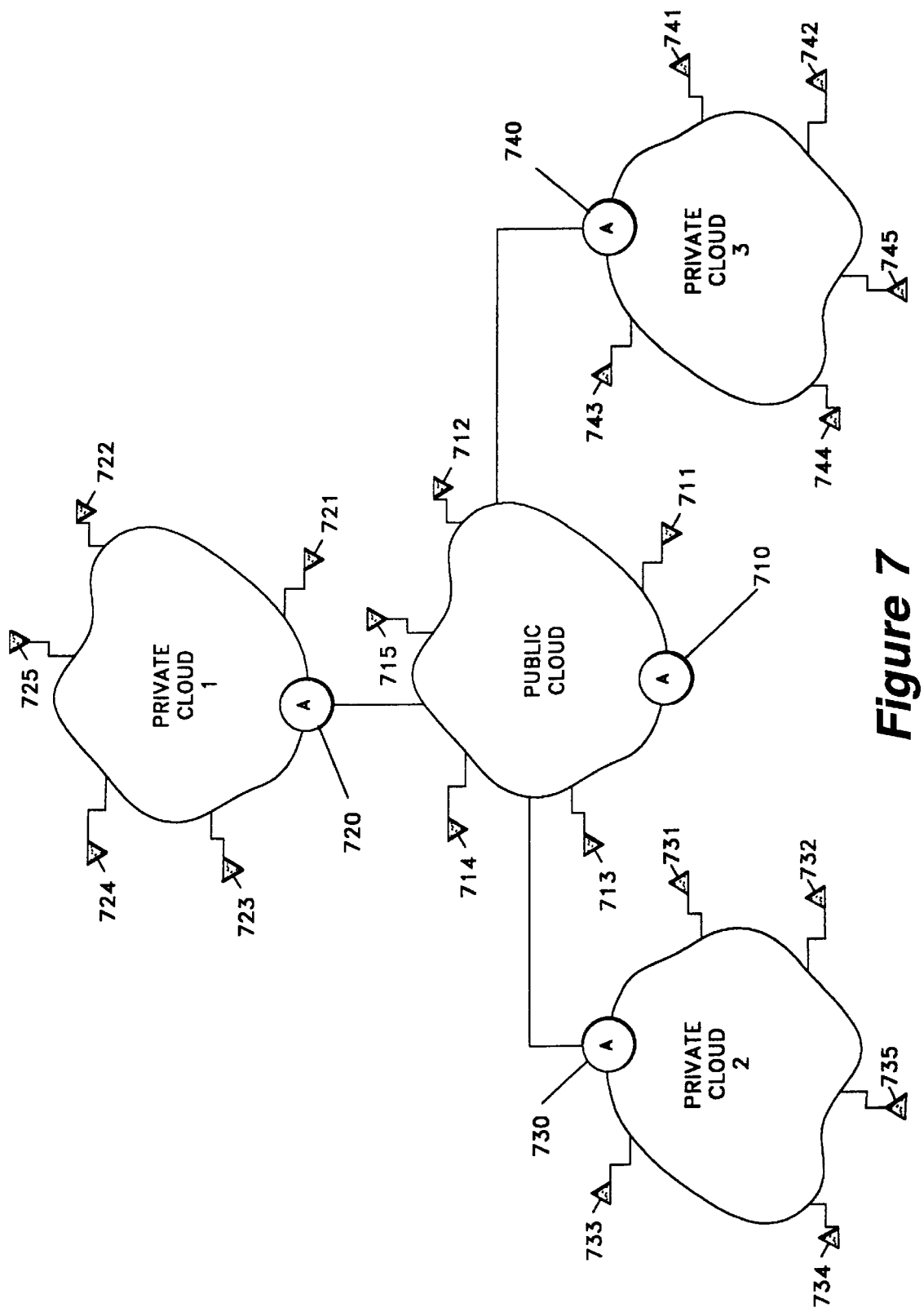
FIG. 7 illustrates conceptually a public cloud network topology.

In order for processes on private clouds to communicate with publicly accessible processes on other private clouds, as well as publicly accessible processes on public clouds, their root services must become a child of a public cloud service, as described hereafter with reference to FIG. 7.

Public clouds serve as the interconnecting mechanism between private clouds Note, a private cloud could be as small as one connection service process. There may exist multiple public clouds. Public clouds may be composed primarily of connection services or information services. Only publicly accessible processes residing on private connection service clouds are propagated up to associated public connection service clouds.

If an information service process is configured via a controller client to be organizationally accessible, the root information service of a private cloud will not propagate that information service's process record up to its parent information service process on the public information service cloud, and, hence, not be present in the main information service catalogue in the root information service on the associated public information service cloud. Only publicly accessible information service processes are contained in the main information service catalogue in the root information service on public information service clouds.

The root information service of each public information service cloud propagates its main information service catalogue down to all child information services recursively through the public information service cloud and further down through each associated private information service cloud, until all information services have the current main information service catalogue. Therefore, when a private information service cloud is connected to a public information service cloud, all information services in the private information service cloud have the main information service catalogue. The main information service catalogue contains all the publicly accessible information services residing on both the public information service cloud and the child private information service clouds. The main information service catalogue may be implemented in a table of content manner, as previously described.

Logging service clouds associated with public cloud service processes are considered to be private, not public, logging clouds since they do not provide a communication links between other private logging service clouds.

If cloud 700 of FIG. 7 depicts a connection service cloud, then the public connection service cloud 710 would have three child private connection service clouds 720, 730 and 740, as well as five publicly accessible processes 711–715 on the public connection service cloud. The root connection services of each of the three private connection service clouds i.e. 720, 730 and 740, would have a parent connection service 710 in the public connection service cloud 700.

As a further illustration of the inventive architecture, referring again to FIG. 7, process 734 on private connection service cloud 2 requests to communicate with publicly accessible process 722 on private connection service cloud 1, assuming connection services are configured for parent to root connection service reconnects and process 722 on private connection service cloud 1 has a fixed transport address. Requesting process 734 is instructed by its parent connection service, not shown, to reconnect to the root connection service 730, which, in turn, instructs process 734 to reconnect to its parent connection service, also not shown, on the public connection service cloud which, in turn, instructs process 734 to reconnect to root connection service 710 on the public connection service cloud 1. Connection service 710 returns the requested process record of process 722. Process 734 on private connection service cloud 2 directly establishes a point-to-point virtual circuit with process 722 on private connection service cloud 1.

In the foregoing example, private clouds 1–3 and the public cloud are illustrated with conceptual cloud topologies similar to that illustrated in FIG. 4B. Similarly, private clouds 1–3 and the public cloud may have actual client process/connection service topologies similar to that illustrated in FIG. 4A, or any other parent/child hierarchy. With the inventive architecture of the present invention, there is no limit to the number of nested parent/child levels, provided the appropriate protocol principles previously described are implemented. Just as private cloud networks, e.g. intranets, may be interconnected to form a public cloud, public clouds may be interconnected to form a global cloud, as explained hereafter.

Global Processes

Three specialized global processes serve to coordinate communications between public clouds: global interconnection service; global information catalogue service; and global logging service.

Figure 8:
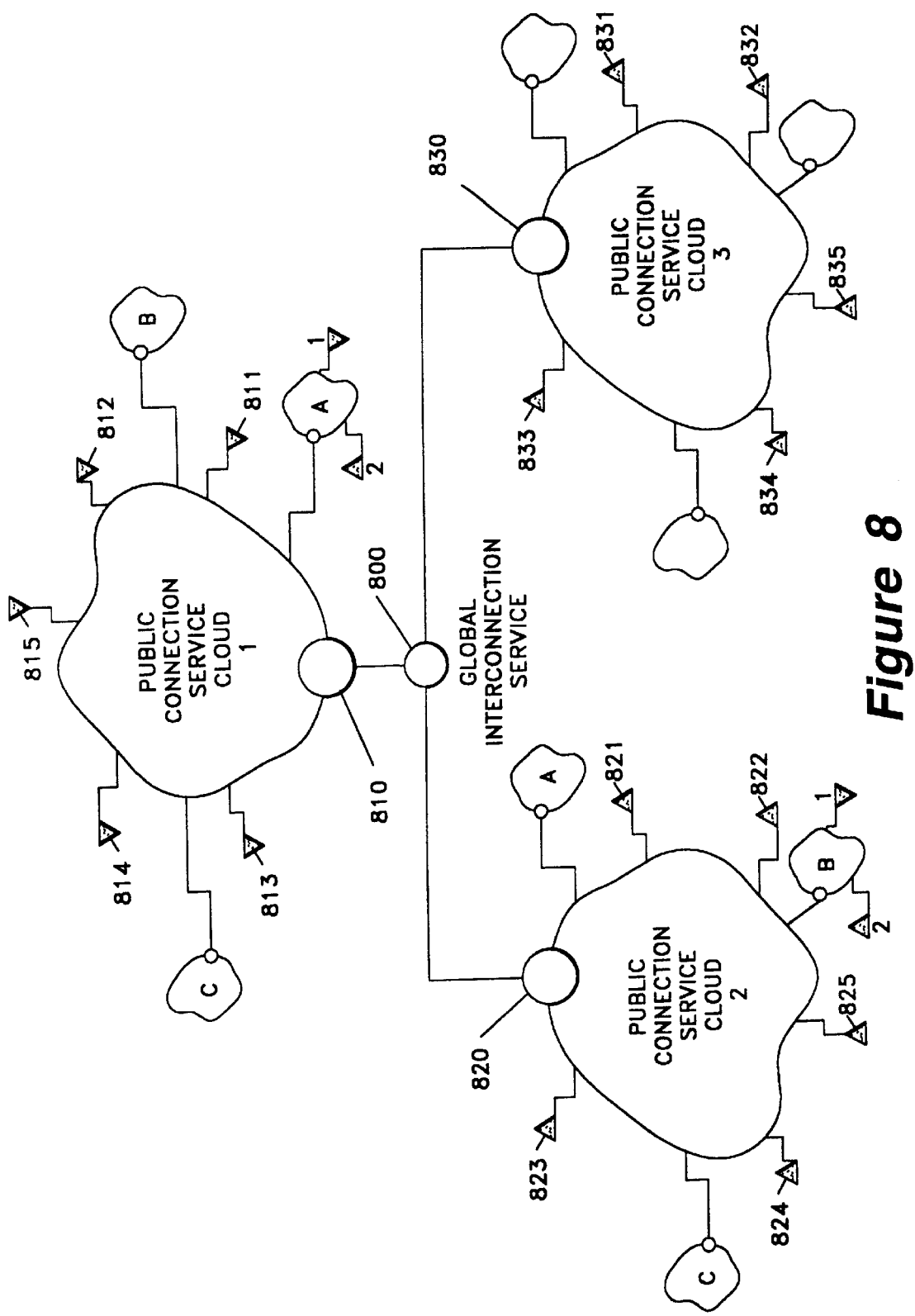
FIG. 8 illustrates conceptually a global interconnection service network topology.

Global interconnection service 800 is the parent connection service to every public connection service cloud's root connection service, e.g. 810, 820 and 830, as illustrated in FIG. 8. In the event a process's communications request reaches the root connection service of a public connection service cloud and no matching process can be found, then the root connection service will connect to the global interconnection service and reissue the request on behalf of the requesting process. The global interconnection service will then connect to the root connection service processes of all the other public connection service clouds which have been designated by the requesting root connection service as being friends. The global interconnection service reissues the request on behalf of the requesting root connection service process. Any of the public cloud root connection service processes which receive the reissued process record request may contain the requested process record of the target process within the database. One of these group connection service processes will return either all process records which match the search criteria or a "best" match process record to the global interconnection service process 800. Global interconnection service process 800 then returns the found process record to the root connection service process of the public cloud which submitted the request. The target process record is then propagated to the originally requesting process which then establishes a direct virtual circuit with the target process.

To further illustrate a global interconnection service topology in accordance with the present invention, consider an example with reference to FIG. 8 in which processes B1 and A2 have fixed transport addresses and are publicly accessible, i.e. the "access control" field in their respective process records specify public access.

Process A2 on private connection service cloud A on public connection service cloud 1 requests to its parent connection service to communicate with process B1 on private connection service cloud B on public connection service cloud 2. Process A2 will be reconnected up the connection service tree until it eventually reissues the request to root connection service 810 on public connection service cloud 1. Root connection service 810 will connect to global interconnection service process 800. The process record request on behalf of process A2. Global interconnection service 800 connects to root connection services 820 and 830 on public connection service cloud 2 and 3, respectively, and reissues the request on behalf of the root connection service 810 of public connection service cloud 1. Root connection service 820 on public connection service cloud 2 will return the process record for process 1 back to the global Interconnection service process 800. Service process 800 will then return the process record to root connection service 810 on public connection service cloud 1 which, in turn, will then return the process record to the requesting process A2. Once process B1's process record is obtained by process A2, process A2 will use the transport address in the process record to directly establish a virtual circuit to process B1.

The global information catalogue service is the repository of all the main information service catalogues from the root information services on each of the public information service clouds. Note publicly accessible client process records are not resident here. The actual client process records are resident within the route information service processes of the respective public and private information service processes and depending on the access specified in each process record. The information service catalogue may be implemented in a "table of contents" type format with each entry containing an identifier of a specific process and an identifier of the information service process, such as a transport address, where the information, including the process record, can be found. The global information catalogue service 900 is illustrated in FIG. 9.

The global information catalogue service process 900 combines all the main information service catalogues together and propagates such catalogue down to the public information service clouds whenever a change occurs to the root information services 910, 920 or 930 on public information service clouds A, E and I, respectively. Service processes 910, 920 and 930, in turn, propagate the catalogue down to all their respective child information services, recursively, throughout the public information service cloud and down through to each associated private information service cloud contained within the public information service cloud. With this technique, all information services in the network topology have the current main information service catalogue.

Figure 9:
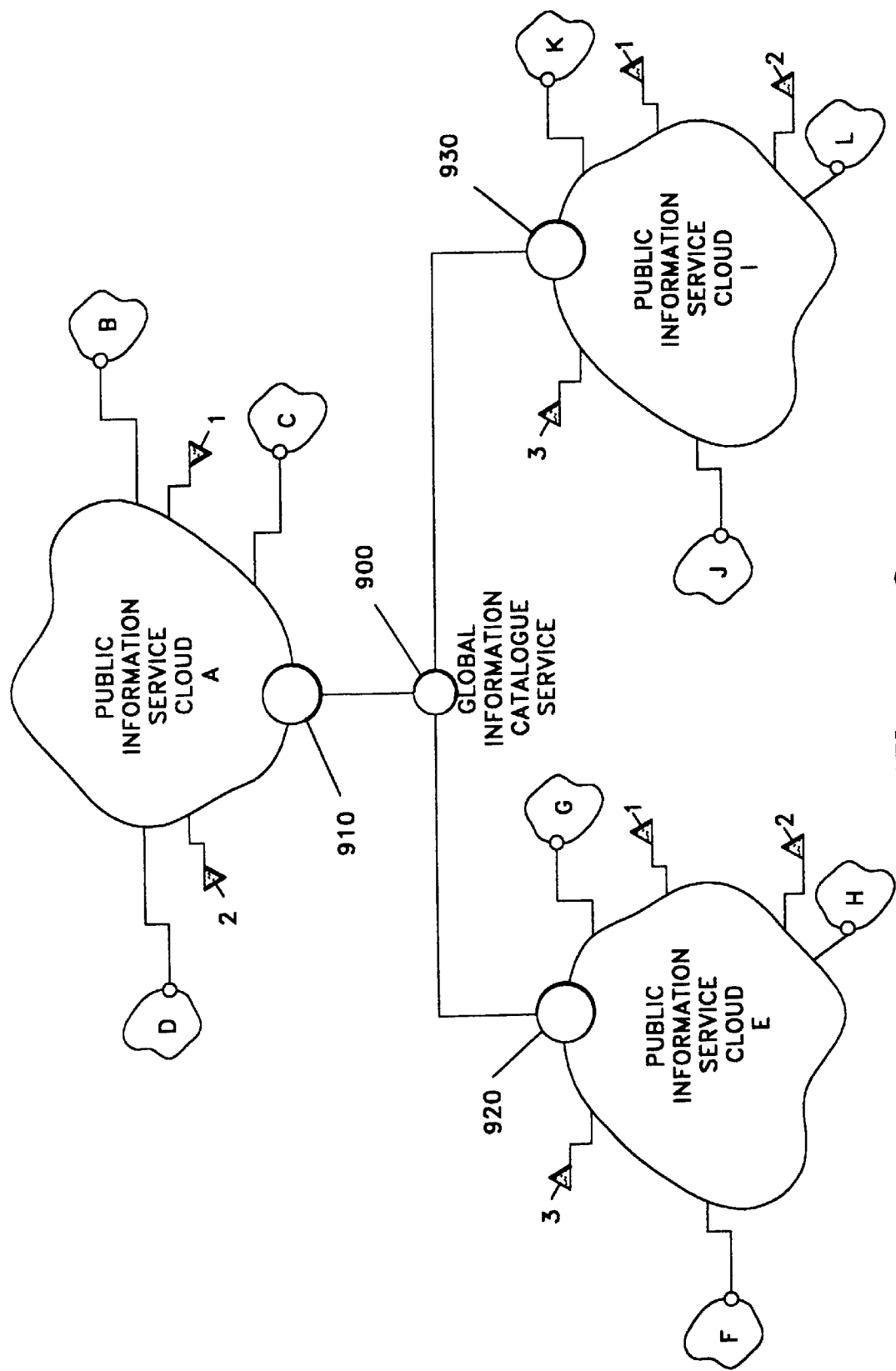
FIG. 9 illustrates conceptually a global interconnection service network topology.

To further illustrate a global information catalogue service in accordance with the present invention, consider the example with reference to FIG. 9, in which the root information service process 910 of public information service cloud A has the following main information service catalogue: A(1,2,B(1,2,3),C(1,2,3),D(1,2)) where A(1,2) are two information services 1 and 2 on the public information service cloud A and B(1,2,3) are three information services 1,2 and 3, not shown, on private cloud B, C(1,2,3) are three information services 1,2 and 3, not shown, on private cloud C and D(1,2) are two information services 1 and 2, not shown, on private cloud D.

The root information service process 920 of public information service cloud E has the following main information service catalogue: E(1,2,3,F(1,2),G(1,2,3),H(1,2)) where E(1,2,3) are three information services 1, 2 and 3 on the public information service cloud E and F(1,2) are two information services 1 and 2, not shown, on private cloud F, G(1,2,3) are three information services 1,2 and 3, not shown, on private cloud G, and H(1,2) are two information services 1 and 2, not shown, on private cloud H.

The root information service process 930 of public information service cloud I has the following main information service catalogue: I(1,2,3,J(1,2),K(1,2),L(1,2,3)) where I(1, 2,3) are three information services 1, 2 and 3 on the public information service cloud I and J(1,2) are two information services 1 and 2, not shown, on private cloud J, K(1,2) are two information services 1 and 2, not shown, on private cloud K and L(1,2,3) are three information services 1, 2 and 3, not shown, on private cloud L.

Assuming all the information services are publicly accessible, the main information service catalogue resident in the global information catalogue service process's 900 database would be (A(1,2,B(1,2,3),C(1,2,3),D(1,2)), E(1,2, 3,F(1,2),G(1,2,3),H(1,2)), I(1,2,3,J(1,2),K(1,2),L(1,2,3)) ). It is this combined main information service catalogue which is propagated down to and is resident on all information services A1, A2, E1, E2, E3, I1, I2 and I3 on the public information service clouds and on information services B1–B3, C1–C3, D1, D2, F1, F2, G1–G3, H1, H2, J1, J2, K1, K2 and L1–L3 on the private information service clouds.

Figure 10:
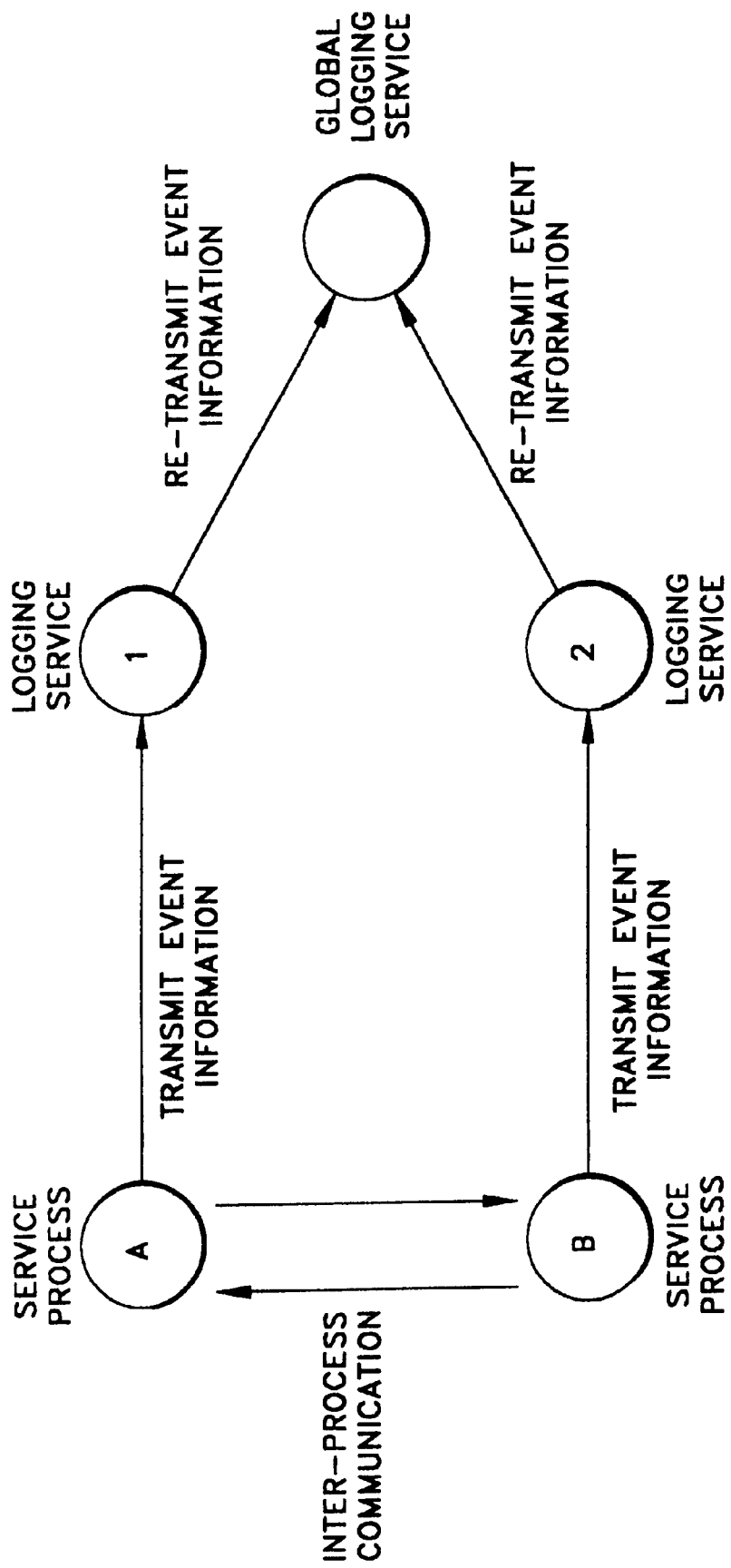
FIG. 10 illustrates a global logging service in accordance with the present invention.

A global logging service is used as a repository of events which occur when two processes on separate public clouds communicate with each other. Each process's respective logging service will propagate their event information to a global logging service, as illustrated in FIG. 10. Consider further the example, also with reference to FIG. 10, in which process A is on a public connection service cloud 1, not shown, and process B is on a public connection service cloud 2, not shown. Logging service 1 is also on a logging service cloud 1, also not shown, associated with processes on public connection service cloud 1, while logging service 2 is also on a logging service cloud 2, also not shown, associated with processes on public connection service cloud 2. Process A logs the event information pertaining to its communications with process B to its primary logging service 1. Similarly, process B logs the event information pertaining to its communications with process A to its primary logging service 2. Both logging services 1 and 2 propagate the event information to the global logging service.

Generally, the event information sent by a process to its primary or secondary logging service contains an instruction to propagate the event to the global logging service in the event the two communicating processes recognize they are not on the same public cloud, as specified in their respective process records. Logging services have an additional property in their process record which defines the transport address of a global logging service. This property is used only by logging services on public logging service clouds. Such property may be implemented with a network transport address, such as an Internet protocol address, similar to other transport addresses and contained within process records.

In yet another alternate embodiment, the invention may be implemented as a computer program product for use with a computer system. In such an implementation, all the functions performed may be implemented with corresponding processor instructions. Any number of programming languages including most processor instruction sets, assembly languages and the C programming language provide facilities which allow for the manipulation of individual bits within a data word, and would be suitable for implementation of such and all software embodiment of the invention. Such implementation may comprise a series of computer instructions either fixed on a tangible medium, such as a computer readable media, e.g. diskette, CD-ROM, ROM, or fixed disk, or transmittable to a computer system, via a modem or other interface device, such as communications adapter connected to a network over a medium. Medium can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention, such modifications to the inventive concept are intended to be covered by the appended claims.

What is claimed is:

1. In a server process executing on a computer network and connectable to at least one parent service process and one child service process, a method of assisting establishment of point-to-point communications between nonservice processes comprising the steps of:
 a. maintaining a local directory database, the local directory database comprising a plurality of process records of selected non-service processes connectable to the server process and further maintaining a local database of child service processes connectable to the server process;
 b. selectively propagating the local directory database to a parent service process;
 c. receiving a request from a nonservice process for the process record of a second process;
 d. searching the local directory database for the process record of the second process; and
 e. supplying one of the process record of the second process or the transport address of a parent or child service process.

2. In a server process executing on a computer network and connectable to at least one parent service process and one child service process, a method of assisting establishment of point-to-point communications between nonservice processes comprising:
 a. maintaining a local database, the local database comprising a selected data from a plurality of process records of processes connectable to the server process;
 b. selectively propagating the local database to a parent service process; and
 c. receiving an information catalog from the parent service process; and
 d. propagating the information catalog to all child service processes of the server process, the information catalog comprising selected data from the process records of processes connectable to the computer network.

3. A computer program product for use with a computer system operatively to a computer network and capable of executing a server process and connectable to at least one parent service process and one child service process, the computer program product comprising a computer useable medium having computer usable program code embedded therein, the program code comprising:
 a. program code for maintaining a local directory database, the local directory database comprising a plurality of process records of selected non-service processes connectable to the server process and further maintaining a local database of child service processes connectable to the server process;
 b. program code for selectively propagating the local directory database to a parent service process;
 c. program code for receiving a request from a nonservice process for the process record of a second process;
 d. program code for searching the local directory database for the process record of the second process; and
 e. program code for supplying one of the process record of the second process or the transport address of a parent or child service process.

4. A computer program product for use with a computer system operatively to a computer network and capable of executing a server process and connectable to at least one parent service process and one child service process, the computer program product comprising a computer useable medium having computer usable program code embedded therein, the program code comprising:
 a. program code for maintaining a local database, the local database comprising a selected data from a plurality of process records of processes connectable to the server process;
 b. program code for selectively propagating the local database to a parent service process; and
 c. program code for receiving an information catalog from the parent service process; and
 d. program code for propagating the information catalog to all child service processes of the server process, the information catalog comprising selected data from the process records of processes connectable to the computer network.

* * * * *